United States Patent
Tang et al.

(10) Patent No.: US 10,592,565 B2
(45) Date of Patent: Mar. 17, 2020

(54) METHOD AND APPARATUS FOR PROVIDING RECOMMENDED INFORMATION

(71) Applicant: Baidu Online Network Technology (Beijing) Co., Ltd., Beijing (CN)

(72) Inventors: Chi Tang, Shanghai (CN); Huadong Li, Beijing (CN); Weiyu Chen, Shanghai (CN); Jiajia Chen, Beijing (CN); Xunliang Cai, Shenzhen (CN); Yang Song, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 314 days.

(21) Appl. No.: 14/587,983

(22) Filed: Dec. 31, 2014

(65) Prior Publication Data

US 2015/0294011 A1 Oct. 15, 2015

(30) Foreign Application Priority Data

Apr. 14, 2014 (CN) .......................... 2014 1 0148403

(51) Int. Cl.
*G06F 15/16* (2006.01)
*G06F 16/9535* (2019.01)
*G06F 16/958* (2019.01)

(52) U.S. Cl.
CPC ........ *G06F 16/9535* (2019.01); *G06F 16/972* (2019.01)

(58) Field of Classification Search
None
See application file for complete search history.

(56) References Cited

U.S. PATENT DOCUMENTS

| | | | |
|---|---|---|---|
| 7,100,123 B1* | 8/2006 | Todd | G06F 17/3061 707/E17.058 |
| 8,478,662 B1 | 7/2013 | Snodgrass et al. | |
| 8,898,297 B1* | 11/2014 | Taylor | G06F 16/9535 709/224 |
| 2001/0049623 A1 | 12/2001 | Aggarwal | |
| 2012/0131032 A1* | 5/2012 | Rakshit | G06F 17/30867 707/767 |

(Continued)

FOREIGN PATENT DOCUMENTS

| | | |
|---|---|---|
| JP | 2013152500 A | 8/2013 |
| WO | WO 2014/027415 A1 | 2/2014 |

*Primary Examiner* — Alex Gofman
(74) *Attorney, Agent, or Firm* — Nixon Peabody LLP

(57) ABSTRACT

An objective of the present invention is providing a method and apparatus for providing recommended information. A method according to the present invention comprises steps of: determining, based on one or more pieces of content information in one or more webpages, whether the one or more pieces of content information may be used as recommended information, respectively; obtaining feature information of the recommended information if the content information is recommended information; determining ordering information of the each piece of recommended information based on the feature information of each piece of recommended information; wherein the method further comprises the following step: if a user's browsing operation on the webpage corresponds to at least one piece of recommended information, presenting the at least one piece of recommended information.

12 Claims, 2 Drawing Sheets

(56) References Cited

U.S. PATENT DOCUMENTS

Figure 1:
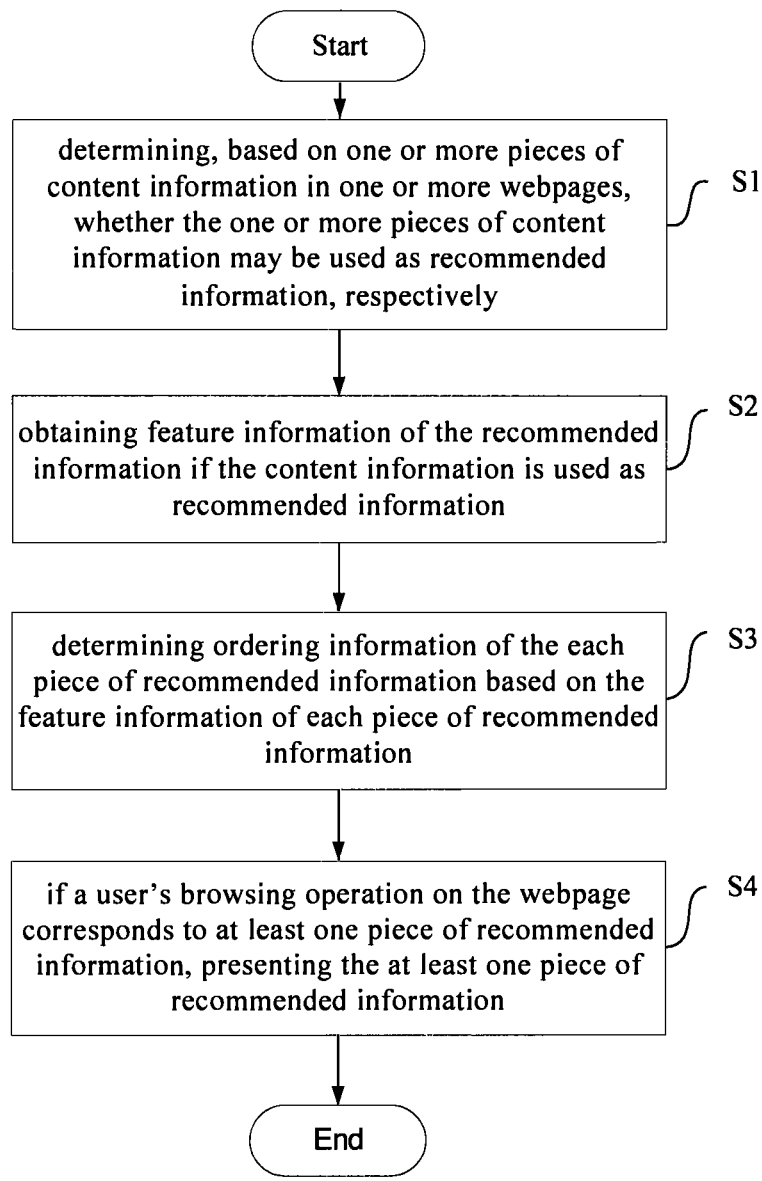

| | | | |
|---|---|---|---|
| 2012/0304065 A1 | 11/2012 | Cai | |
| 2014/0188927 A1* | 7/2014 | Moxley | G06F 17/30867 |
| | | | 707/769 |
| 2014/0280043 A1* | 9/2014 | Griffin | G06F 16/3322 |
| | | | 707/722 |

* cited by examiner

METHOD AND APPARATUS FOR PROVIDING RECOMMENDED INFORMATION

REFERENCE TO RELATED APPLICATION

The present application claims priority to Chinese Patent Application No. 201410148403.0, filed Apr. 14, 2014, the disclosure of which is incorporated herein by reference.

FIELD OF THE INVENTION

The present invention relates to the field of computer technology, and more specifically to a method and apparatus for providing recommended information.

BACKGROUND OF THE INVENTION

In the prior art, when performing information recommendation in a webpage, the recommended information or keywords for recommendation and the like are generally displayed at a corner position of the webpage, and the recommended information is always independent with the body content of the webpage. Moreover, a prior art solution cannot promptly display relevant recommended information at the moment a user browses a content in his/her interest, which dampens the recommendation effect.

SUMMARY OF THE INVENTION

An objective of the present invention is providing a method and apparatus for providing recommended information.

According to one aspect of the present invention, there is provided a method for providing recommended information, wherein the method comprises steps of:
  determining, based on one or more pieces of content information in one or more webpages, whether the one or more pieces of content information may be used as recommended information, respectively;
  obtaining feature information of the recommended information if the content information is used as recommended information;
  determining ordering information of the each piece of recommended information based on the feature information of each piece of recommended information;
  wherein the method further comprises the following step:
  if a user's browsing operation on the webpage corresponds to at least one piece of recommended information, presenting the at least one piece of recommended information.

According to one aspect of the present invention, there is provided a recommending apparatus for providing recommended information, wherein the apparatus comprises:
  a device configured to determine, based on one or more pieces of content information in one or more webpages, whether the one or more pieces of content information may be used as recommended information, respectively;
  a device configured to obtain feature information of the recommended information if the content information is recommended information;
  a device configured to determine ordering information of the each piece of recommended information based on the feature information of each piece of recommended information;
  wherein the recommending apparatus further comprises:
  a device configured to, if a user's browsing operation on the webpage corresponds to at least one piece of recommended information, present the at least one piece of recommended information.

Compared with the prior art, the present invention has the following advantages: enhancing the efficiency of on-line information recommendation by pre-obtaining content information in a plurality of web pages and its corresponding recommended information; presenting corresponding recommended information based on a user's browsing operation during the process of the user's browsing a web page, such that the user can immediately look up relevant recommended information at the moment he/she browses the content information in his/her interest, which further enhances the recommendation effect.

BRIEF DESCRIPTION OF THE ACCOMPANYING DRAWINGS

Figure 2:
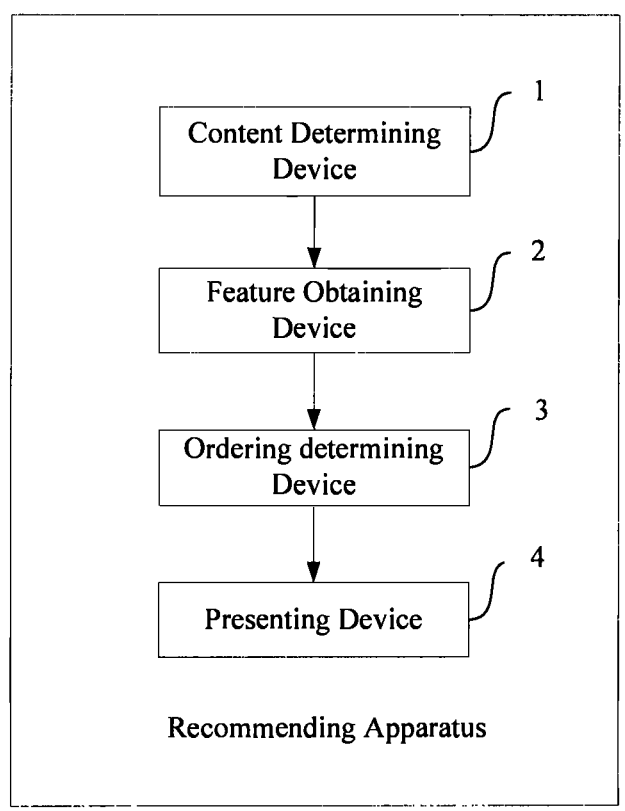

Features, advantages, and other aspects of various embodiments of the present disclosure will become more apparent through the following detailed description with reference to the following drawings, wherein:

FIG. 1 schematically shows a flow diagram of a method for providing recommended information according to the present invention;

FIG. 2 schematically shows a structural diagram of a recommending apparatus for providing recommended information according to the present invention;

In the drawings, same or similar reference numerals represent same or similar components.

DETAILED DESCRIPTION OF THE PREFERRED EMBODIMENTS

Hereinafter, the present invention will be described in detail with reference to the accompanying drawings.

FIG. 1 schematically shows a flow diagram of a method for providing recommended information according to the present invention. The method according to the present invention comprises step S1, step S2, step S3, and step S4.

Here, the method according to the present invention is implemented by a recommending apparatus included in a computer device. The computer device includes an electronic device capable of automatically performing numerical calculation and information processing according to pre-set or pre-stored instructions, whose hardware includes, but not limited to a microprocessor, an application-specific integrated circuit (ASIC), a field programmable gate array (FPGA), a digital processor (DSP), an embedded device, and the like. The network device includes, but not limited to, a single network server, a server cluster comprised of a plurality of network servers, or a cloud composed of a great number of hosts or servers based on cloud computing, wherein cloud computing is a kind of distributed computation, or a virtual super computer composed of a group of loosely coupled computer clusters. The user equipment includes, but not limited to, any mobile electronic product performing human-machine interaction with a user through a keyboard, a touch pad, or a voice control device, e.g., a smart phone, a PDA (personal digital assistant). The network includes, but not limited to, Internet, wide area network, metropolitan area network, local area network, VPN network, and etc.

It should be noted that the user equipment, network device or network are only examples, and other existing or future possibly developed user equipment, network device or network, if applicable to the present invention, should also be included within the protection scope of the present invention and is incorporated here by reference.

Refer to FIG. 1. In step S1, a recommending apparatus determines, based on one or more pieces of content information in one or more webpages, whether the one or more pieces of content information may be used as recommended information, respectively.

Herein, the content information includes, but not limited to, at least any one of the following:

1) text information in a webpage, e.g., a segment of texts or keywords in the webpage.
2) picture information in a webpage, e.g., caption information or descriptive information of the picture.
3) link in a webpage;
4) audio-video information in a webpage, e.g., caption information or descriptive information of the audio-video.

Specifically, the recommending apparatus determines, based on one or more pieces of content information in one or more webpages and based on a predetermined selection rule, whether the one or more pieces of content information may be used as recommended information, respectively.

Herein, the predetermined selection rule is associated with attribute information of each piece of content information, wherein the attribute information includes, but not limited to, at least any one of the following:

1) media type information of the content information; preferably, the media type includes, but not limited to, at least any one of the following:
   i) text type;
   ii) picture type;
   iii) audio-video type.
2) position information of the content information in the webpage to which the content information belongs. For example, coordinate information of a text block corresponding to the text information in the webpage to which the text block belongs; for another example, an area of the webpage in which a video plugin is presented, etc.

For example, the predetermined selection rule comprises using a predetermined type of content information as the recommended information; for another example, the predetermined selection rule comprises selecting content information in a predetermined area in the webpage as the recommended information.

Preferably, the manner in which the recommending apparatus respectively determines, based on one or more items of content information in one or more webpages and based on a predetermined selection rule, whether the one or more items of content information may be used as recommended information, includes, but not limited to, any one of the following:

1) the recommending apparatus determines whether content information may be used as recommended information based on an information type of the content information;

For example, content information of a webpage includes a segment of text and two videos; besides, the predetermined selection rule in the recommending apparatus is "using the content information of a picture type and/or video type as the recommended information," and the recommending apparatus determines whether the content information may be used as recommended information based on the rule.

2) the recommending apparatus determines whether content information may be used as recommended information based on a presentation location of the content information in the webpage.

For example, the recommending apparatus determines whether the content information may be used as recommended information based on predetermined selection rule "content information in an area besides the two edges and the bottom in a webpage."

Next, in step S2, the recommending apparatus obtains feature information of the recommended information if the content information is used as recommended information.

Herein, the feature information comprises the following at least one item of information:

1) media type information of the recommended information;
2) user statistical information of the recommended information, wherein the user statistical information is used for indicating all users' access operations on the recommended information. For example, information like the frequency of all users clicking onto the recommended object; for another example, the collection amount of the recommended information of all the users, etc.;
3) weight information of the recommended information.

Preferably, the manner in which the recommending apparatus obtains the weight information of the recommended information includes, but not limited to, any one of the following:

i) the recommending apparatus determines, bases on statistical information of search corresponding to each piece of recommended information, its weight information.

Herein, the statistical information of search includes, but not limited to at least any one of the following items:

a) quantitative information of search results corresponding to the recommended information in the search engine;
b) frequency information of the recommended information being browsed or searched in the search engine.

Specifically, the recommending apparatus performs network search based on each piece of recommended information, respectively, to obtain search statistical information of the search results corresponding to the each piece of recommended information. Next, the recommending apparatus determines, based on the search statistical information of each piece of recommended information, weight information corresponding to each piece of recommended information.

ii) the recommending apparatus determines, based on media type information of each piece of recommended information and/or user statistical information of the recommended information, the weight information corresponding to each piece of recommended information.

According to a first example of the present invention, the recommending apparatus determines, in step S1, that text text_1 in webpage page_1, text text_2 and picture pic_1 in webpage page_2 are recommended information. Moreover, the recommending apparatus determines, in step S1, content information in a plurality of webpages which may be used as recommended information, respectively, to establish a database including a plurality of pieces of recommended information. Next, the recommending apparatus obtains that the numbers of search results resulting from searching the text text_1, text text_2, and picture pic_1 in the search engine are 324, 50, and 78, respectively, and uses the numbers of the search results as the weight information of the text text_1, text text_2, and picture pic_1, respectively.

It should be noted that, the above example is only for better illustrating the technical solution of the present invention, not intended to limit the present invention. Those skilled in the art should understand that any implementation manner of obtaining feature information of recommended information if content information is used as the recommended information should be included within the scope of the present invention.

Next, in step S3, the recommending apparatus determines ordering information of the each piece of recommended information based on the feature information of each piece of recommended information.

For example, if the feature information includes a media type, the recommending apparatus, based on a predetermined priority sequence "video type>audio type>picture type," orders each piece of recommended information based on its media type.

For another example, if the feature information includes user statistical information/weight information, the recommended apparatus performs ordering based on the user statistical information/weight information of the each recommended information.

It should be noted that the recommending apparatus may re-perform steps S1 to step S3 every a predetermined time so as to update the recommended information corresponding to one or more webpages, respectively, and each feature information and ordering information of each recommended information.

Next, in step S4, if a user's browsing operation on the webpage corresponds to at least one piece of recommended information, the recommending apparatus presents the at least one piece of recommended information.

Herein, the recommended information may be information coming from the web site to which the present webpage belongs or information coming externally beyond the web site to which the present webpage belongs.

Specifically, the recommending apparatus determines at least one piece of candidate content information corresponding to the browsing operation of the user; next, the recommending apparatus determines whether there is recommended information corresponding to each candidate content information or not, respectively; and, if there is recommended information corresponding to the candidate content information, displays the recommended information.

Continue illustration of the above first example. If the user is browsing webpage page-3, the recommending apparatus determines that the candidate content information corresponding a present cursor location is keyword keyword_1, then the recommending apparatus queries in the database which is determined in step S1 and including multiple items of recommended information based on the keyword keyword_1, and obtains that the recommended information corresponding to the keyword keyword_1 includes: text text_1, text text_2, and picture pic_1, then the recommending apparatus determines that there is recommended information corresponding to the keyword keyword_1, and unfolds a floating window at the current cursor location, so as to presents each recommended information successively based on the weight values of the three pieces of recommended information as determined in step S3 in a descending order of the weight values.

It should be noted that the above example is only for better illustrating the technical solution of the present invention, not intended to limit the present invention. Those skilled in the art should understand that any implementation manner of presenting the at least one piece of recommended information if the user's browsing operation on the webpage corresponds to at least one piece of recommended information should be included within the scope of the present invention.

Preferably, the method according to the present invention further comprises step S5 (not shown).

In step S5, the recommending apparatus obtains one or more pieces of recommended information corresponding to the browsing operation.

Specifically, the manner in which the recommending apparatus obtains one or more items of recommended information corresponding to the browsing operation includes, but not limited to, the following manners:

1) the recommending apparatus obtains candidate content information corresponding to the user's browsing operation on a webpage; next, the recommending apparatus queries in a plurality of pieces of recommended information obtained in step S1 based on the obtained candidate content information, to obtain one or more pieces of recommended information corresponding to the candidate content information.

2) the recommending apparatus obtains candidate content information corresponding to a user's browsing operation on a webpage; next, the recommending apparatus performs network search based on the candidate content information to obtain search results corresponding to the candidate content information; moreover, the recommending apparatus determines recommended information corresponding to the candidate content information based on the search result.

Preferably, the recommending apparatus first determines one or more pieces of query information based on the candidate content information, and then performs network search based on the one or more pieces of query information, to obtain search results corresponding to the candidate content information.

For example, if the candidate content information is text, the recommending apparatus first performs a word segmentation operation based on the text, and uses a plurality of words obtained from the word segmentation operation as query information to perform network search, so as to obtain search results corresponding to the candidate content information. For another example, if the candidate content information is video, the recommending apparatus first obtains various pieces of information such as the name of the video, actors, and descriptive information, and performs network search based on the obtained various pieces of information, to obtain search results corresponding to the video.

Herein, the manner in which the recommending apparatus determines recommended information corresponding to the candidate content information based on the search result includes, but not limited to, at least any one of the following:

i) the recommending apparatus uses all search results corresponding to the candidate content information as the recommended information for the candidate content information;

ii) the recommending apparatus determines recommended information corresponding to the candidate content information based on media type of the candidate content information.

Preferably, the recommending apparatus selects a search result of the same media type as the candidate content information to be the recommended information for the candidate content information.

For example, the candidate content information is descriptive information of a movie video, and the search result according to the video, obtained by the recommending apparatus through network search based on descriptive information of the movie, includes: network address information of 10 pictures and network address information of 20 videos associated with the video. Then, the recommending apparatus, based on the media type "video type" of the candidate content information, to uses the network address information of the 20 videos of the same video type as the recommended information corresponding to the movie video.

Preferably, the recommending apparatus further pre-processes the candidate content information to obtain supplementary query information; next, the recommending apparatus performs network search based on the supplementary query information, so as to obtain the supplementary recommendation information corresponding to the candidate content information.

Herein, the manner in which the recommending apparatus pre-processes the candidate content information includes, but not limited to, any one of the following:

1) if the candidate content information includes text information, obtaining supplementary query information corresponding to the text information through operations such as segmenting or extending the text information;
2) if the candidate content information includes any one of media information like video, audio, picture and the like, obtaining the supplementary query information corresponding to the candidate content information through performing multimedia processing operations such as object recognition/audio extraction, and the like.

More preferably, the recommending apparatus determines one or more pieces of recommended information corresponding to the user's browsing operation based on the user's network historical records.

Herein, the network historical records include, but not limited to, at least any one of the following:

1) the user's historical browsing records within a predetermined period of time;
2) the user's historical search records within a predetermined period of time;
3) preset user preference information.

For example, the recommending apparatus selects, from among a plurality of search results corresponding to the candidate content information, search results associated with the user's browsing records and search records as the recommended information.

Preferably, the method according to the present invention further comprises step S6 not shown) and step S7 (not shown) before step S1.

In step S6, the recommending apparatus decides whether each webpage in the one or more webpages meets a predetermined condition.

Herein, the manner in which the recommending apparatus decides whether each webpage in the one or more webpages meets a predetermined condition includes, but not limited to, any one of the following:

1) the recommending apparatus evaluates user values of the each webpage based on the user's historical records information; next, the recommending apparatus decides whether the each webpage meets the predetermined condition based on the user values of the each webpage.

Herein, the user value indicates a webpage's recommendation value for a present user.

For example, the recommending apparatus determines that a webpage ever browsed by the user has a higher user value, which thereby meets the predetermined condition; then, the recommending apparatus decides whether each webpage meets the predetermined condition based on "whether the user ever browsed the webpage."

2) the recommending apparatus decides whether each webpage in the one or more webpages meets a predetermined condition based on webpage type of each webpage.

Herein, the webpage type includes, but not limited, any one of the following:

1) non-content type pages: e.g., channel page, catalog page, etc.;
2) content type pages: e.g., news pages, commodity exhibition pages, novel chapter pages, etc.

Next, in step S7, if the webpage meets the predetermined condition, the recommending apparatus obtains content information included in said webpage.

For example, the predetermined condition present in the recommending apparatus for obtaining content information of a webpage is: the frequency of the webpage being accessed in the past 6 months is greater than once per 30 days, and the webpage is a content type page. Then, the recommending apparatus decides, based on the user's frequencies of accessing each webpage in the last six months, that webpage page_4, webpage page_5 and webpage page_6, whose access frequencies are larger than once per 30 days, meet the predetermined condition. Further, the recommending apparatus obtains that the webpage page_4 is a catalog page, the webpage page_5 is a news webpage, and the webpage page_6 is a novel page. Then, the recommending apparatus decides that the webpage page_5 does not meet the predetermined condition based on the predetermined condition and the types of the three webpages. Then, the recommending apparatus obtains the content information included in the webpage page_4 and webpage page_6, to perform information recommendation.

It should be noted that that the above example is only for better illustrating the technical solution of the present invention, rather than limiting the present invention. Those skilled in the art should understand that any implementation manner of deciding each webpage of the one or more webpages meets a predetermined condition and obtaining content information included within the webpage when the webpage meets the predetermined condition, should be included within the scope of the present invention.

The method of the present invention is capable of enhancing the efficiency of on-line information recommendation by pre-obtaining content information in a plurality of webpages and its corresponding recommended information; through presenting corresponding recommended information based on a user's browsing operation during the process of browsing a webpage by the user, such that the user can immediately look up relevant recommended information at the moment he/she browses the content information in his/her interest, which further enhances the recommendation effect.

FIG. 2 schematically shows a structural diagram of a recommending apparatus for providing recommended information according to the present invention. Herein, the recommending apparatus comprises: a device configured to, based on one or more pieces of content information in one or more webpages, determine whether the one or more pieces of content information may be used as recommended information, respectively (hereinafter referred to as "information determining device 1"); a device configured to obtain feature information of the recommended information when the content information is recommended information (hereinafter referred to as "feature obtaining device 2"); a device configured to, based on the feature information of each recommended information, determine ordering information of the each recommended information (hereinafter referred to as "an ordering determining device 3"); wherein the recommending apparatus further comprises: a device configured to, when a user's browsing operation on the webpage corresponds to at least one piece of recommended information, present the at least one piece of recommended information (hereinafter referred to as "presenting device 4").

Referring to FIG. 2, the information determining device 1 determines, based on one or more pieces of content information in one or more webpages, whether the one or more pieces of content information may be used as recommended information, respectively.

Herein, the content information includes, but not limited to, at least any one of the following:
1) text information in a webpage, e.g., a segment of texts or keywords in the webpage.
2) picture information in a webpage, e.g., caption information or descriptive information of the picture.
3) link in a webpage;
4) audio-video information in a webpage, e.g., caption information or descriptive information of the audio-video.

Specifically, information determining device 1 determines, based on one or more pieces of content information in one or more webpages and based on a predetermined selection rule, whether the one or more pieces of content information may be used as recommended information, respectively.

Herein, the predetermined selection rule is associated with attribute information of each piece of content information, wherein the attribute information includes, but not limited to, at least any one of the following:
1) media type information of the content information; preferably, the media type includes, but not limited to, at least any one of the following:
   i) text type;
   ii) picture type;
   iii) audio-video type.
2) position information of the content information in the webpage to which the content information belongs. For example, coordinate information of a text block corresponding to the text information in the webpage to which the text block belongs; for another example, an area of the webpage in which a video plugin is presented, etc.

For example, the predetermined selection rule comprises using a predetermined type of content information as the recommended information; for another example, the predetermined selection rule comprises selecting content information in a predetermined area in the webpage as the recommended information.

Preferably, the manner in which the information determining device 1 respectively determines, based on one or more items of content information in one or more webpages and based on a predetermined selection rule, whether the one or more items of content information may be used as recommended information, includes, but not limited to, any one of the following:
1) the information determining device 1 determines whether content information may be used as recommended information based on an information type of the content information;

For example, content information of a webpage includes a segment of text and two videos; besides, the predetermined selection rule in the recommending apparatus is "using the content information of a picture type and/or video type as the recommended information," and the information determining device 1 determines whether the content information may be used as recommended information based on the rule.
2) the information determining device 1 determines whether content information may be used as recommended information based on a presentation location of the content information in the webpage.

For example, the information determining device 1 determines whether the content information may be used as recommended information based on predetermined selection rule "content information in an area besides the two edges and the bottom in a webpage."

Next, the feature obtaining device 2 obtains feature information of the recommended information if the content information is used as recommended information.

Herein, the feature information comprises the following at least one item of information:
1) media type information of the recommended information;
2) user statistical information of the recommended information, wherein the user statistical information is used for indicating all users' access operations on the recommended information. For example, information like the frequency of all users clicking onto the recommended object; for another example, the collection amount of the recommended information of all the users, etc.;
3) weight information of the recommended information.

Preferably, the manner in which the feature obtaining device 2 obtains the weight information of the recommended information includes, but not limited to, any one of the following:
i) the feature obtaining device 2 determines, bases on statistical information of search corresponding to each piece of recommended information, its weight information.

Herein, the statistical information of search includes, but not limited to at least any one of the following items:
a) quantitative information of search results corresponding to the recommended information in the search engine;
b) frequency information of the recommended information being browsed or searched in the search engine.

Herein, the feature obtaining device 2 further comprises: a device configured to perform network search based on said each piece of recommended information respectively, so as to obtain search statistical information of search results associated with said each recommended information (not shown, hereinafter referred to as "an information searching device"); a device configured to determine, based on the search statistical information of said each piece of recommended information, weight information of the each piece of recommended information, respectively not shown, hereinafter referred to as "a weight determining device").

Specifically, the information searching device performs network search based on each piece of recommended information, respectively, to obtain search statistical information of the search results corresponding to the each piece of recommended information. Next, the weight determining device determines, based on the search statistical information of each piece of recommended information, weight information corresponding to each piece of recommended information.
ii) the feature obtaining device 2 determines, based on media type information of each piece of recommended information and/or user statistical information of the recommended information, the weight information corresponding to each piece of recommended information.

According to a first example of the present invention, the information determining device 1 determines, that text text_1 in webpage page_1, text text_2 and picture pic_1 in webpage page_2 are recommended information. Moreover, the information determining device 1 determines, content information in a plurality of webpages which may be used as recommended information, respectively, to establish a database including a plurality of pieces of recommended information. Next, the feature obtaining device 2 obtains that the numbers of search results resulting from searching the text text_1, text text_2, and picture pic_1 in the search engine are 324, 50, and 78, respectively, and uses the numbers of the search results as the weight information of the text text_1, text text_2, and picture pic_1, respectively.

It should be noted that, the above example is only for better illustrating the technical solution of the present invention, not intended to limit the present invention. Those skilled in the art should understand that any implementation manner of obtaining feature information of recommended information if content information is used as the recommended information should be included within the scope of the present invention.

Next, the ordering determining device 3 determines ordering information of the each piece of recommended information based on the feature information of each piece of recommended information.

For example, if the feature information includes a media type, the ordering determining device 3, based on a predetermined priority sequence "video type>audio type>picture type," orders each piece of recommended information based on its media type.

For another example, if the feature information includes user statistical information/weight information, the ordering determining device 3 performs ordering based on the user statistical information/weight information of the each recommended information.

It should be noted that the recommending apparatus may re-perform, every a predetermined time, the operations that from the operation of determining, based on one or more pieces of content information in one or more webpages, whether the one or more pieces of content information may be used as recommended information, respectively, to the operation of determining ordering information of the each piece of recommended information based on the feature information of each piece of recommended information, no as to update the recommended information corresponding to one or more webpages, respectively, and each feature information and ordering information of each recommended information.

Next, if a user's browsing operation on the webpage corresponds to at least one piece of recommended information, the presenting device 4 presents the at least one piece of recommended information.

Herein the presenting device comprises: a device configured to determine at least one piece of candidate content information corresponding to said user's the browsing operation (not shown, hereinafter referred to as "a content determining device"); a device configured to decide whether there is recommended information corresponding to each piece of candidate content information, respectively (not shown, hereinafter referred to as "a deciding device"); a device configured to, present said recommended information if there is recommended information corresponding to said each piece of candidate content information (not shown, hereinafter referred to as "a sub-presenting device").

Specifically, the content determining device determines at least one piece of candidate content information corresponding to the browsing operation of the user; next, the deciding device determines whether there is recommended information corresponding to each candidate content information or not, respectively; and, if there is recommended information corresponding to the candidate content information, the sub-presenting device displays the recommended information.

Continue illustration of the above first example. If the user is browsing webpage page-3, the content determining device determines that the candidate content information corresponding a present cursor location is keyword keyword_1, then the deciding device queries in the database which is determined by the information determining device 1 and including multiple items of recommended information based on the keyword keyword_1, and obtains that the recommended information corresponding to the keyword keyword_1 includes: text text_1, text text_2, and picture pic_1, then determines that there is recommended information corresponding to the keyword keyword_1, and the sub-presenting device unfolds a floating window at the current cursor location, so as to presents each recommended information successively based on the weight values of the three pieces of recommended information as determined in step S3 in a descending order of the weight values.

It should be noted that the above example is only for better illustrating the technical solution of the present invention, not intended to limit the present invention. Those skilled in the art should understand that any implementation manner of presenting the at least one piece of recommended information if the user's browsing operation on the webpage corresponds to at least one piece of recommended information should be included within the scope of the present invention.

Preferably, the recommending apparatus according to the present invention further comprises a device configured to obtain one or more pieces of recommended information corresponding to the browsing operation (not shown, hereinafter referred to as "an information obtaining device"). And the information obtaining device further comprises: a device configured to obtain candidate content information corresponding to the user's browsing operation on a webpage (not shown, hereinafter referred to as "a candidate obtaining device"); a device configured to perform network search based on the candidate content information so as to obtain search results corresponding to the candidate content information (not shown, hereinafter referred to as "a candidate searching device"); a device configured to determine recommended information corresponding to the candidate content information based on the search results (not shown, hereinafter referred to as "a sub-information obtaining device").

Specifically, the manner in which the information obtaining device obtains one or more items of recommended information corresponding to the browsing operation includes, but not limited to, the following manners:

1) the information obtaining device obtains candidate content information corresponding to the user's browsing operation on a webpage; next, the information obtaining device queries in a plurality of pieces of recommended information obtained by the information determining device 1 based on the obtained candidate content information, to obtain one or more pieces of recommended information corresponding to the candidate content information.

2) the candidate obtaining device obtains candidate content information corresponding to a user's browsing operation on a webpage; next, the candidate searching device performs network search based on the candidate content information to obtain search results corresponding to the candidate content information; moreover, the sub-information obtaining device determines recommended information corresponding to the candidate content information based on the search result.

Preferably, the candidate searching device first determines one or more pieces of query information based on the candidate content information, and then performs network search based on the one or more pieces of query information, to obtain search results corresponding to the candidate content information.

For example, if the candidate content information is text, the candidate obtaining device first performs a word segmentation operation based on the text, and uses a plurality of words obtained from the word segmentation operation as query information to perform network search, no as to obtain search results corresponding to the candidate content information. For another example, if the candidate content information is video, the candidate obtaining device first obtains various pieces of information such as the name of the video, actors, and descriptive information, and performs network search based on the obtained various pieces of information, to obtain search results corresponding to the video.

Herein, the manner in which the sub-information obtaining device determines recommended information corresponding to the candidate content information based on the search result includes, but not limited to, at least any one of the following:
i) the sub-information obtaining device uses all search results corresponding to the candidate content information as the recommended information for the candidate content information;
ii) the sub-information obtaining device determines recommended information corresponding to the candidate content information based on media type of the candidate content information.

Preferably, the sub-information obtaining device selects a search result of the same media type as the candidate content information to be the recommended information for the candidate content information.

For example, the candidate content information is descriptive information of a movie video, and the search result according to the video, obtained by the candidate searching device through network search based on descriptive information of the movie, includes: network address information of 10 pictures and network address information of 20 videos associated with the video. Then, the sub-information obtaining device, based on the media type "video type" of the candidate content information, uses the network address information of the 20 videos of the same video type as the recommended information corresponding to the movie video.

Preferably, the recommending apparatus further comprises: a device configured to pre-process the candidate content information to obtain supplementary query information (not shown, hereinafter referred to as "a candidate processing device"); a device configured to perform network search based on the supplementary query information, so as to obtain the supplementary recommendation information corresponding to the candidate content information (not shown).

Herein, the manner in which the candidate processing device pre-processes the candidate content information includes, but not limited to, any one of the following:
1) if the candidate content information includes text information, obtaining supplementary query information corresponding to the text information through operations such as segmenting or extending the text information;
2) if the candidate content information includes any one of media information like video, audio, picture and the like, obtaining the supplementary query information corresponding to the candidate content information through performing multimedia processing operations such as object recognition/audio extraction, and the like.

More preferably, the information obtaining device is also configured to determine one or more pieces of recommended information corresponding to the user's browsing operation based on the user's network historical records.

Herein, the network historical records include, but not limited to, at least any one of the following:
1) the user's historical browsing records within a predetermined period of time;
2) the user's historical search records within a predetermined period of time;
3) preset user preference information.

For example, the information obtaining device selects, from among a plurality of search results corresponding to the candidate content information, search results associated with the user's browsing records and search records as the recommended information.

Preferably, the recommending apparatus according to the present invention further comprises: a device configured to decide whether each webpage of the one or more webpages meets a predetermined condition (not shown, hereinafter referred to as "a webpage deciding device"); a device configured to, if the webpage meets the predetermined condition, obtain content information included in said webpage (not shown). Preferably, the webpage deciding device further comprises: a device configured to, based on historical record information of the user, evaluate user values of said each webpage (not shown, hereinafter referred to as "an evaluating device"); a device configured to decide whether said each webpage meets the predetermined condition based on the user values of said each webpage (not shown, hereinafter referred to as "a value deciding device").

Herein, the manner in which the webpage deciding device decides whether each webpage in the one or more webpages meets a predetermined condition includes, but not limited to, any one of the following:
1) the evaluating device evaluates user values of the each webpage based on the user's historical records information; next, the value deciding device decides whether the each webpage meets the predetermined condition based on the user values of the each webpage.

Herein, the user value indicates a webpage's recommendation value for a present user.

For example, the evaluating device determines that a webpage ever browsed by the user has a higher user value, which thereby satisfies the predetermined condition; then, the value deciding device decides whether each webpage meets the predetermined condition based on "whether the user ever browsed the webpage."
2) the webpage deciding device decides whether each webpage in the one or more webpages meets a predetermined condition based on webpage type of each webpage.

Herein, the webpage type includes, but not limited, any one of the following:
1) non-content type pages: e.g., channel page, catalog page, etc.;
2) content type pages: e.g., news pages, commodity exhibition pages, novel chapter pages, etc.

For example, the predetermined condition present in the recommending apparatus for obtaining content information of a webpage is: the frequency of the webpage being accessed in the past 6 months is greater than once per 30 days, and the webpage is a content type page. Then, the webpage deciding device decides, based on the user's frequencies of accessing each webpage in the last six months, that webpage page_4, webpage page_5 and webpage page_6, whose access frequencies are larger than once per 30 days, meet the predetermined condition. Further, the recommending apparatus obtains that the webpage page_4 is a catalog page, the webpage page_5 is a news webpage, and the webpage page_6 is a novel page. Then, the webpage deciding device decides that the webpage page_5 does not meet the predetermined condition based on the predetermined condition and the types of the three webpages. Then, the recommending apparatus obtains the content information included in the webpage page_4 and webpage page_6, to perform information recommendation.

It should be noted that the above example is only for better illustrating the technical solution of the present invention, rather than limiting the present invention. Those skilled in the art should understand that any implementation manner of decides whether each webpage in the one or more webpages meets a predetermined condition and obtaining content information included within the webpage if the webpage meets the predetermined condition, should be included within the scope of the present invention.

The manner of the present invention is capable of enhancing the efficiency of on-line information recommendation by pre-obtaining content information in a plurality of webpages and its corresponding recommended information; through presenting corresponding recommended information based on a user's browsing operation during the process of browsing a webpage by the user, such that the user can immediately look up relevant recommended information at the moment he/she browses the content information in his/her interest, which further enhances the recommendation effect.

The software program of the present invention may be executed through a processor to implement the steps or functions as mentioned above. Likewise, the software program (including relevant data structure) of the present invention may be stored in a computer readable recording medium, e.g., RAM memory, magnetic or optic driver or soft floppy or similar devices. Additionally, some steps or functions of the present invention may be implemented by hardware, for example, a circuit cooperating with the processor so as to implement various steps of functions.

Additionally, a part of the present invention may be applied as a computer program product, e.g., a computer program instruction, which, when being executed by the computer, may invoke or provide a method and/or technical solution according to the present invention. Further, the program instruction invoking the method of the present invention may be stored in a fixed or mobile recording medium, and/or communicated through broadcast or data stream in other signal carrying media, and/or stored in a work memory of a computer device running based on the program instruction. Here, one embodiment according to the present invention comprises an apparatus that includes a memory storing the computer program instruction and a processor executing the program instruction, wherein when being executed by the processor, the computer program instruction triggers the apparatus to operate the method and/or technical solution according to a plurality of embodiments of the present invention as mentioned above.

To those skilled in the art, it is apparent that the present invention is not limited to the details of the above exemplary embodiments, and the present invention may be implemented with other embodiments without departing from the spirit or basic features of the present invention. Thus, in any way, the embodiments should be regarded as exemplary, not limitative; the scope of the present invention is limited by the appended claims, instead of the above depiction. Thus, all variations intended to fall into the meaning and scope of equivalent elements of the claims should be covered within the present invention. No reference signs in the claims should be regarded as limiting the involved claims. Besides, it is apparent that the term "comprise" does not exclude other units or steps, and singularity does not exclude plurality. A plurality of units or modules stated in a system claim may also be implemented by a single unit or module through software or hardware. Terms such as the first and the second are used to indicate names, but do not indicate any particular sequence.

Aspects of various embodiments are specified in the claims. Those and other aspects of various embodiments and specified in the following numbered clauses:

1. A method for providing recommended information, wherein the method comprises steps of:
   determining, based on one or more pieces of content information in one or more webpages, whether the one or more pieces of content information may be used as recommended information, respectively;
   obtaining feature information of the recommended information if the content information is used as recommended information;
   determining ordering information of the each piece of recommended information based on the feature information of each piece of recommended information;
   wherein the method further comprises the following step:
   if a user's browsing operation on the webpage corresponds to at least one piece of recommended information, presenting the at least one piece of recommended information.

2. The method according to clause 1, wherein the method further comprises a step of:
   obtaining one or more pieces of recommended information corresponding to the browsing operation.

3. The method according to clause 2, wherein the step of obtaining one or more pieces of recommended information corresponding to the browsing operation comprises steps of:
   obtaining candidate content information corresponding to the user's browsing operation on a webpage;
   performing network search based on the candidate content information so as to obtain search results corresponding to the candidate content information;
   determining recommended information corresponding to the candidate content information based on the search results.

4. The method according to clause 3, wherein the method further comprises steps of:
   pre-processing the candidate content information so as to obtain supplementary query information:
   performing network search based on the supplementary query information to obtain supplementary recommended information corresponding to the candidate content information.

5. The method according to any one of clauses 2 to 4, wherein the step of obtaining one or more pieces of recommended information corresponding to said browsing operation comprises a step of:
  determining, based on network historical records of said user, one or more pieces of recommended information corresponding to the user's browsing operation.

6. The method according to any one of clauses 1 to 5, wherein if a user's browsing operation on the webpage corresponds to at least one piece of recommended information, presenting the at least one piece of recommended information comprises steps of:
  determining at least one piece of candidate content information corresponding to said user's the browsing operation;
  deciding whether there is recommended information corresponding to each piece of candidate content information, respectively;
  presenting said recommended information if there is recommended information corresponding to said each piece of candidate content information.

7. The method according to any one of clauses 1 to 6, wherein the feature information includes weight information of the recommended information, wherein the method further comprises steps of:
  performing network search based on said each piece of recommended information respectively, so as to obtain search statistical information of search results associated with said each recommended information;
  based on the search statistical information of said each piece of recommended information, determining weight information of the each piece of recommended information, respectively.

8. The method according to any one of clauses 1 to 7, wherein, before the step of determining whether one or more pieces of content information may be used as recommended information, respectively, the method further comprises the steps of:
  deciding whether each webpage of the one or more webpages meets a predetermined condition;
  if the webpage meets the predetermined condition, obtaining content information included in said webpage.

9. The method according to clause 8, wherein the step of deciding each webpage of the one or more webpages meets a predetermined condition comprises steps of:
  based on historical record information of the user, evaluating user values of said each webpage;
  deciding whether said each webpage meets the predetermined condition based on the user values of said each webpage.

10. A recommending apparatus for providing recommended information, wherein the apparatus comprises:
  a device configured to determine, based on one or more pieces of content information in one or more webpages, whether the one or more pieces of content information may be used as recommended information, respectively;
  a device configured to obtain feature information of the recommended information if the content information is recommended information;
  a device configured to determine ordering information of the each piece of recommended information based on the feature information of each piece of recommended information;
  wherein the recommending apparatus further comprises:
  a device configured to, if a user's browsing operation on the webpage corresponds to at least one piece of recommended information, presenting the at least one piece of recommended information.

11. The recommending apparatus according to clause 10, wherein the recommending apparatus further comprises:
  a device configured to obtain one or more pieces of recommended information corresponding to the browsing operation.

12. The recommending apparatus according to clause 11, wherein the device configured to obtain one or more items of recommended information corresponding to the browsing operation comprises steps of:
  a device configured to obtain candidate content information corresponding to the user's browsing operation on a webpage;
  a device configured to perform network search based on the candidate content information so as to obtain search results corresponding to the candidate content information;
  a device configured to determine recommended information corresponding to the candidate content information based on the search results.

13. The recommending apparatus according to clause 12 wherein the recommending apparatus further comprises:
  a device configured to pre-process the candidate content information so as to obtain supplementary query information;
  a device configured to perform network search based on the supplementary query information to obtain supplementary recommended information corresponding to the candidate content information.

14. The recommending apparatus according to any one of clauses 11 to 13, wherein the device configured to obtain one or more pieces of recommended information corresponding to said browsing operation is further configured to:
  Determine, based on network historical records of said user, one or more pieces of recommended information corresponding to the user's browsing operation 15. The recommending apparatus according to any one of clauses 10 to 14, wherein if a user's browsing operation on the webpage corresponds to at least one piece of recommended information, the device configured to present the at least one piece of recommended information comprises:
  a device configured to determine at least one piece of candidate content information corresponding to said user's the browsing operation;
  a device configured to decide whether there is recommended information corresponding to each piece of candidate content information, respectively;
  a device configured to, present said recommended information if there is recommended information corresponding to said each piece of candidate content information.

16. The recommending apparatus according to any one of clauses 10 to 15, wherein the feature information includes weight information of the recommended information, wherein the recommending apparatus further comprises:
  a device configured to perform network search based on said each piece of recommended information respectively, so as to obtain search statistical information of search results associated with said each recommended information;
  a device configured to determine, based on the search statistical information of said each piece of recommended information, weight information of the each piece of recommended information, respectively.

17. The recommending apparatus according to any one of clauses 10 to 16, wherein the recommending apparatus further comprises:
 a device configured to decide whether each webpage of the one or more webpages meets a predetermined condition;
 a device configured to, if the webpage meets the predetermined condition, obtain content information included in said webpage.

18. The recommending apparatus according to clause 17, wherein the device configured to decide whether each webpage of the one or more webpages meets a predetermined condition comprises:
 a device configured to, based on historical record information of the user, evaluate user values of said each webpage;
 a device configured to decide whether said each webpage meets the predetermined condition based on the user values of said each webpage.

19. A non-transitory computer readable storage medium, including computer code, which, when being executed, causes a method according to any one of clauses 1-9 to be executed.

20. A computer program product, which, when executed by a computer device, causes a method according to any one of clauses 1-9 to be executed.

21. A computer device comprising a memory and a processor, wherein the memory stores computer code, and the processor is configured to perform a method according to any one of clauses 1-9 by performing the computer code.

The invention claimed is:
1. A method for providing recommended information, the method comprising:
 deciding whether each webpage of a plurality of webpages satisfies a predetermined condition;
 responsive to the each webpage satisfying the predetermined condition, obtaining content information included in the each webpage;
 responsive to the obtaining the content information, determining, based on position information of the content information in the each webpage, whether the one or more pieces of obtained content information is used as recommended information, respectively;
 obtaining feature information of the recommended information if the content information is used as the recommended information;
 determining ranking information of each piece of recommended information based on the feature information of the each piece of recommended information, the feature information of the recommended information comprising at least one of media type information, user statistical information or weight information;
 determining whether a user's browsing operation on a first part of a webpage corresponds to candidate content information and if so:
  obtaining query information corresponding to the candidate content information;
  obtaining a plurality of pieces of recommended information corresponding to the browsing operation on the first part of the webpage by performing a network search based on the query information to obtain search results corresponding to the candidate content information;
  determining based on the obtained search results the recommended information corresponding to the candidate content information, the user's browsing operation being a location of a cursor on the webpage; and
  presenting the recommended information corresponding to the candidate content information by unfolding on a presenting device a floating window at the browsing operation during a process of the user's browsing the webpage such that the user can immediately look up any of the recommended information corresponding to the candidate content information as the user browses the webpage, where the recommended information corresponding to the candidate content information are presented in the floating window based on the determined ranking information of each piece of the recommended information presented in the floating window, and where the recommended information presented in the floating window are obtained from different webpages;
 determining whether a user's further browsing operation on a second part of the webpage or on the floating window corresponds to further candidate content information and if so:
  obtaining further query information corresponding to the further candidate content information;
  obtaining a plurality of pieces of further recommended information corresponding to the further browsing operation on the second part of the webpage or on the floating window by performing a further network search based on the further query information to obtain further search results corresponding to the further candidate content information;
  determining based on the obtained further search results the recommended information corresponding to the further candidate content information, the user's further browsing operation being a location of a cursor on the webpage or the floating window; and
  presenting the further recommended information corresponding to the further candidate content information by unfolding on the presenting device a further floating window at the further browsing operation during the process of the user's browsing the webpage or the floating window such that the user can immediately look up any of the further recommended information corresponding to the further candidate content information as the user browses the webpage or the floating window, where the further recommended information corresponding to the further candidate content information are presented in the further floating window based on the determined ranking information of each of the further recommended information presented in the further floating window, wherein the method further comprises:
 pre-processing the candidate content information to obtain supplementary query information corresponding to the candidate content information, including:
  in response to the candidate content information including media information, obtaining the supplementary query information corresponding to the media information by performing multimedia processing operations including at least one of object recognition or audio extraction; and
  in response to the candidate information including text information, obtaining supplementary query information corresponding to the text information by at least one of segmenting or extending the text information; and performing a network search based on the supplementary query information to obtain supplementary recommended information corresponding to the candidate content information.

2. The method according to claim 1, wherein if a user's browsing operation on the webpage corresponds to at least one piece of recommended information, presenting the at least one piece of recommended information comprises steps of:
   determining at least one piece of candidate content information corresponding to said user's the browsing operation;
   deciding whether there is recommended information corresponding to each piece of candidate content information, respectively; and
   presenting said recommended information if there is recommended information corresponding to each piece of candidate content information.

3. The method according to claim 1, wherein the feature information includes weight information of the recommended information, wherein the method further comprises steps of:
   performing a network search based on each piece of recommended information respectively, so as to obtain search statistical information of search results associated with each recommended information; and
   based on the search statistical information of each piece of recommended information, determining weight information of each piece of recommended information, respectively.

4. The method according to claim 1, wherein the step of deciding each webpage of the one or more webpages meets a predetermined condition comprises the steps of:
   based on historical record information of the user, evaluating user values of each webpage; and
   deciding whether each webpage meets the predetermined condition based on the user values of said each webpage.

5. A non-transitory computer readable storage medium, including computer code, which, when being executed, causes a method according to claim 1 to be executed.

6. A computer program product, which, when executed by a computer device, causes a method according to claim 1 to be executed.

7. A computer device comprising a memory and a processor, wherein the memory stores computer code, and the processor is configured to perform a method according to claim 1 by performing the computer code.

8. The method according to claim 1, wherein whether the each webpage of a plurality of webpages satisfies the predetermined condition is determined based on at least one of:
   a user value of the each webpage, evaluated based on at least one of: a user's historical browsing records within a predetermined period of time, user's historical search records within a predetermined period of time, or preset user preference information; and
   webpage type of the each webpage.

9. A recommending apparatus for providing recommended information, wherein the apparatus comprises:
   a processor;
   a storage medium;
   a device configured to decide whether each webpage of a plurality of webpages satisfies a predetermined condition;
   a device configured to, responsive to the each webpage satisfying the predetermined condition, obtain content information included in the each webpage;
   a device configured to, responsive to the obtaining the content information, determine, based on position information of the content information in the each webpage, whether the one or more pieces of obtained content information is used as recommended information, respectively;
   a device configured to obtain feature information of the recommended information if the content information is used as the recommended information, the feature information of the recommended information comprising at least one of media type information, user statistical information or weight information;
   a device configured to determine ranking information of each piece of recommended information based on the feature information of each piece of recommended information; and
   a device configured to determine whether a user's browsing operation on a first part of a webpage corresponds to candidate content information and if so the device further configured to:
   obtain query information corresponding to the candidate content information:
   obtain a plurality of pieces of recommended information corresponding to the browsing operation on the first part of the webpage by performing a network search based on the query information to obtain search results corresponding to the candidate content information;
   determine based on the obtained search results the recommended information corresponding to the candidate content information, the user's browsing operation being a location of a cursor on the webpage; and
   present the at least one piece of recommended information corresponding to the candidate content information by unfolding on a presenting device a floating window at the browsing operation during a process of the user's browsing the webpage such that the user can immediately look up any of the recommended information corresponding to the candidate content information as the user browses the webpage, where the recommended information corresponding to the candidate content information are presented in the floating window based on the determined ranking information of each piece of the recommended information presented in the floating window, and where the recommended information presented in the floating window are obtained from different webpages;
   a device configured to determine whether a user's further browsing operation on a second part of the webpage or on the floating window corresponds to further candidate content information and if so the device further configured to:
   obtain further query information corresponding to the further candidate content information;
   obtain a plurality of pieces of further recommended information corresponding to the further browsing operation on the second part of the webpage or on the floating window by performing a further network search based on the further query information to obtain further search results corresponding to the further candidate content information;
   determine based on the obtained further search results the recommended information corresponding to the further candidate content information, the user's further browsing operation being a location of a cursor on the webpage or the floating window; and present the further recommended information corresponding to the further candidate content information by unfolding on the presenting device a further floating window at the further browsing operation during the process of the user's browsing the webpage or the floating window such that the user can immediately look up any of the further recommended information corresponding to the further candidate content information as the user browses the webpage or the floating window, where the further recommended information corresponding to the further candidate content information are presented in the further floating window based on the determined ranking information of each of the further recommended information presented in the further floating window, wherein the recommending apparatus further comprises:

a device configured to pre-process the candidate content information so as to obtain supplementary query information, including:

in response to the candidate content information including media information, obtain the supplementary query information corresponding to the media information by performing multimedia processing operations including at least one of object recognition or audio extraction; and in response to the candidate information including text information, obtaining supplementary query information corresponding to the text information by at least one of segmenting or extending the text information; and a device configured to perform a network search based on the supplementary query information to obtain supplementary recommended information corresponding to the candidate content information.

10. The recommending apparatus according to claim 9, wherein if a user's browsing operation on the webpage corresponds to at least one piece of recommended information, the device configured to present the at least one piece of recommended information comprises:

a device configured to determine at least one piece of candidate content information corresponding to said user's the browsing operation;

a device configured to decide whether there is recommended information corresponding to each piece of candidate content information, respectively; and a device configured to present said recommended information if there is recommended information corresponding to each piece of candidate content information.

11. The recommending apparatus according to claim 9, wherein the feature information includes weight information of the recommended information, wherein the recommending apparatus further comprises:

a device configured to perform a network search based on each piece of recommended information respectively, so as to obtain search statistical information of search results associated with each recommended information;

a device configured to determine, based on the search statistical information of each piece of recommended information, weight information of each piece of recommended information, respectively.

12. The recommending apparatus according to claim 9, wherein the device configured to decide whether each webpage of the one or more webpages meets a predetermined condition comprises:

a device configured to, based on historical record information of the user, evaluate user values of each webpage; and a device configured to decide whether each webpage meets the predetermined condition based on the user values of each webpage.

\* \* \* \* \*